United States Patent [19]

Bishop et al.

[11] Patent Number: 5,115,505
[45] Date of Patent: May 19, 1992

[54] CONTROLLED DYNAMIC LOAD BALANCING FOR A MULTIPROCESSOR SYSTEM

[75] Inventors: Thomas P. Bishop, Aurora; Mark H. Davis, Warrenville; James S. Peterson, Aurora; Grover T. Surratt, West Chicago, all of Ill.

[73] Assignee: AT&T Bell Laboratories, Murray Hill, N.J.

[21] Appl. No.: 545,679

[22] Filed: Jun. 28, 1990

Related U.S. Application Data

[63] Continuation of Ser. No. 941,701, Dec. 22, 1986, abandoned.

[51] Int. Cl.$^5$ .......................... G06F 9/46; G06F 15/16
[52] U.S. Cl. ..................... 395/650; 364/230; 364/230.3; 364/229; 364/229.2; 364/280; 364/281.3; 364/281; 364/281.6; 364/281.7
[58] Field of Search ... 364/200 MS File, 900 MS File

[56] References Cited

U.S. PATENT DOCUMENTS

| | | | |
|---|---|---|---|
| 3,593,300 | 7/1971 | Driscoll, Jr. ......................... | 364/200 |
| 4,073,005 | 2/1978 | Parkin ................................ | 364/200 |
| 4,530,051 | 7/1985 | Johnson et al. ..................... | 364/200 |
| 4,853,872 | 8/1989 | Shimoi ................................ | 364/200 |

OTHER PUBLICATIONS

Hwang et al. "Aunix-based local computer network with load balancing", Computer, vol. 15, No. 4, Apr. 1982, pp. 55-65.
McKeag et al., "Studies in operating systems", Academic-Press, London, GB, 1976, pp. 27-35.
Faro et al., "Theory and Implementation of Distributed System Management", IEEE Infocom '86, Fifth Annual Conference, Computers and Communications Integration Design, Analysis Management, Miami, Florida Apr. 8th-10th 1986, pp. 405-414.
AT&T Book, Chapter 13, Copyright 1986, pp. 412-431, "The Design of the UNIX ® Operating System", Maurice J. Bach.
Sun Microsystems, Inc. Manual, Jan. 1985, pp. ii-12, "Remote Procedure Call Protocol Specification".
Electronics Article, Jul. 1983, pp. 118-124, "Unix Variant Opens a Path to Managing Multiprocessor Systems", Paul Jackson, Convergent Technologies, Santa Clara, Calif.
Thesis, May 1981, "Remote Procedure Call", Bruce Jay Nelson, Ser. No. 416,649, filed Sep. 10, 1982.

Primary Examiner—Gareth D. Shaw
Assistant Examiner—Paul Kulik
Attorney, Agent, or Firm—John C. Moran

[57] ABSTRACT

A method for allowing a system administrator, application programmer, and/or program user to adjust the processor assignment function in a multiprocessor system. The system administrator controls the assignment function by defining certain system variables and flags. The application programmer can adjust the assignment function by causing allocation parameters to be passed in a system call before execution of the assignment function. To adjust the assignment function, the program user executes a system command that inserts similar allocation parameters into the program object code file stored in a file system on the multiprocessor system. The program executing the assignment function is responsive to the system variables and flags as well as the allocation parameters and performs the assignment function as it has been adjusted on a system, program or user level basis.

16 Claims, 11 Drawing Sheets

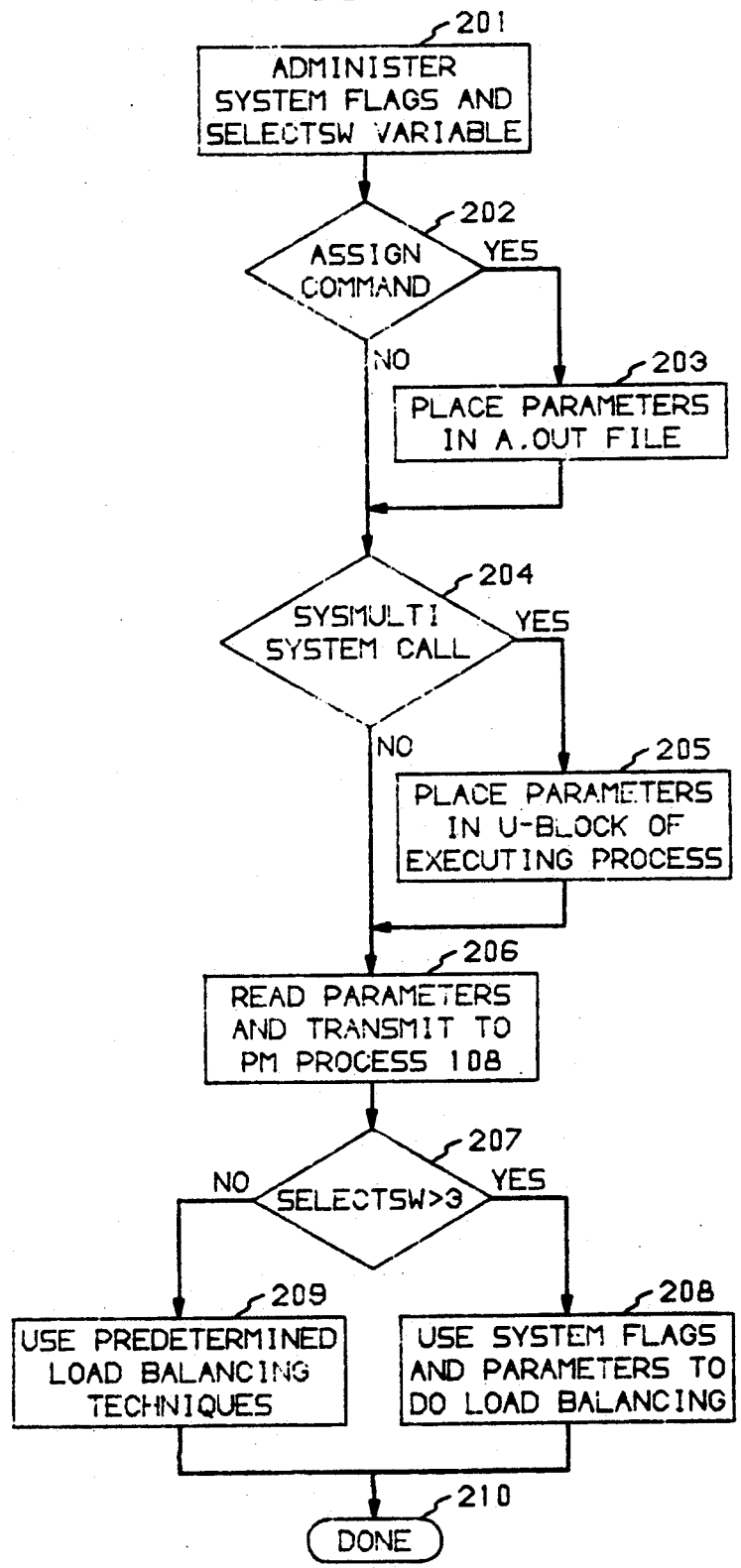

```
struct assign
        {MAXCOMPAT,
         PEFLAG,
         PRIFLAG,
         CPUFLAG,
         MEMFLAG,
         SHTXTFLAG,
         AOUTFLAG,
         OLDUSERFLAG,
         REQFLAG,
         STUBLIMIT,
         FILEFLAG,
         CPUADJ,
         IDLEADJ,
         CFUZZY,
         MFUZZY}
```

\\———————FLAG STRUCTURE———————/

FIG. 3

```
struct imexec0info
{
        long              tsize;
        long              dbsize;
        ushort            f_magic;
        ushort            f_flags;
        bic_id_t          pe_assign;
        bic_id_t          olduser;
        bic_id_t          a_outpe;
        struct inode *    a_outinode;
        bic_id_t          filepe;
        int               n_stubs;
        int               n_files;
        int               pid;
        int               shtxtmap[4];
        struct peselset   assign_set;
        ushort            i_mode;
        ushort            i_uid;
        ushort            i_gid;
}
```

\\——————INPUT PARAMETER STRUCTURE——————/

FIG. 4

```
struct assign {
        int_as_maxcompat;
        int_as_peflag;
        int_as_priflag;
        int_as_cpuflag;
        int_as_memflag;
        int_as_shtxtflag;
        int_as_aoutflag;
        int_as_olduserflag;
        int_as_reqflag;
        int_as_stublimit;
        int_as_fileflag;
        int_as_filelimit;
        int_as_cpuadj;
        int_as_idleadj;
        int_as_cfuzzy;
        int_as_mfuzzy;
};
```

\\———— TUNEABLE FLAG STRUCTURE ————/

FIG. 5

```
struct peselect
{
        unsigned long    allow;              ~601
        unsigned long    disallow;           ~602
        unsigned long    include[MAPSIZE];   ~603
        unsigned long    exclude[MAPSIZE];   ~604
        unsigned long    memory;             ~605
        unsigned int     fdpe;               ~606
        unsigned int     flags;              ~607
};
```

\\———— PE SELECTION SET ————/

FIG. 6

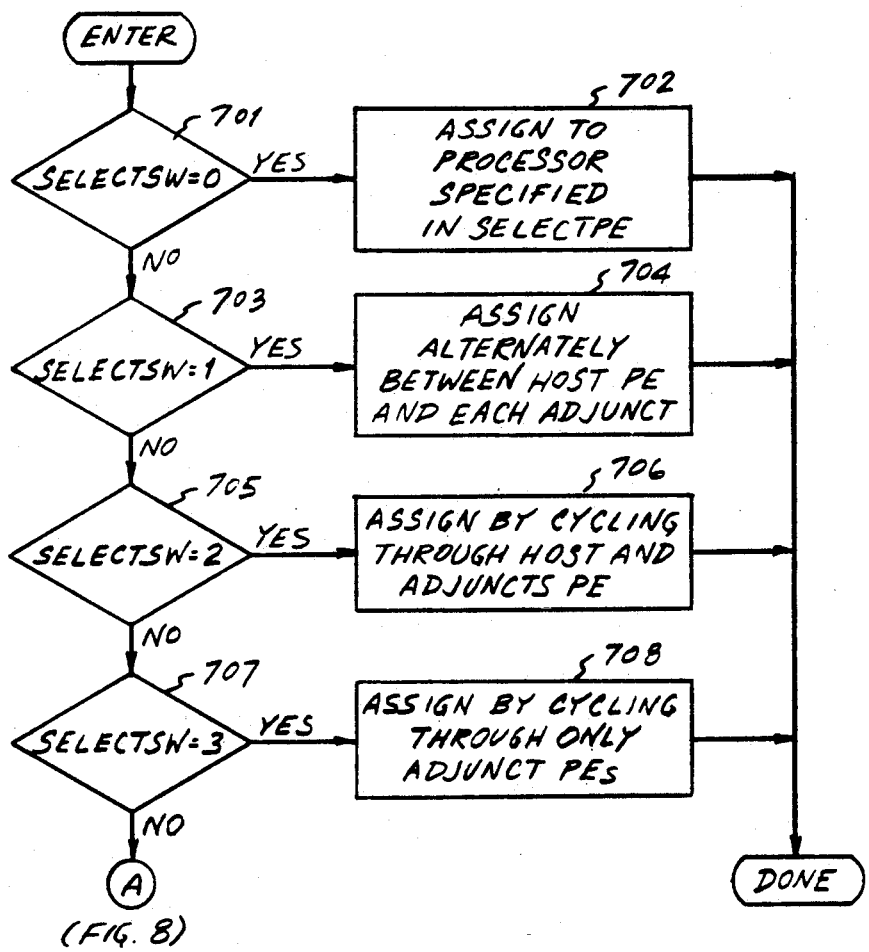

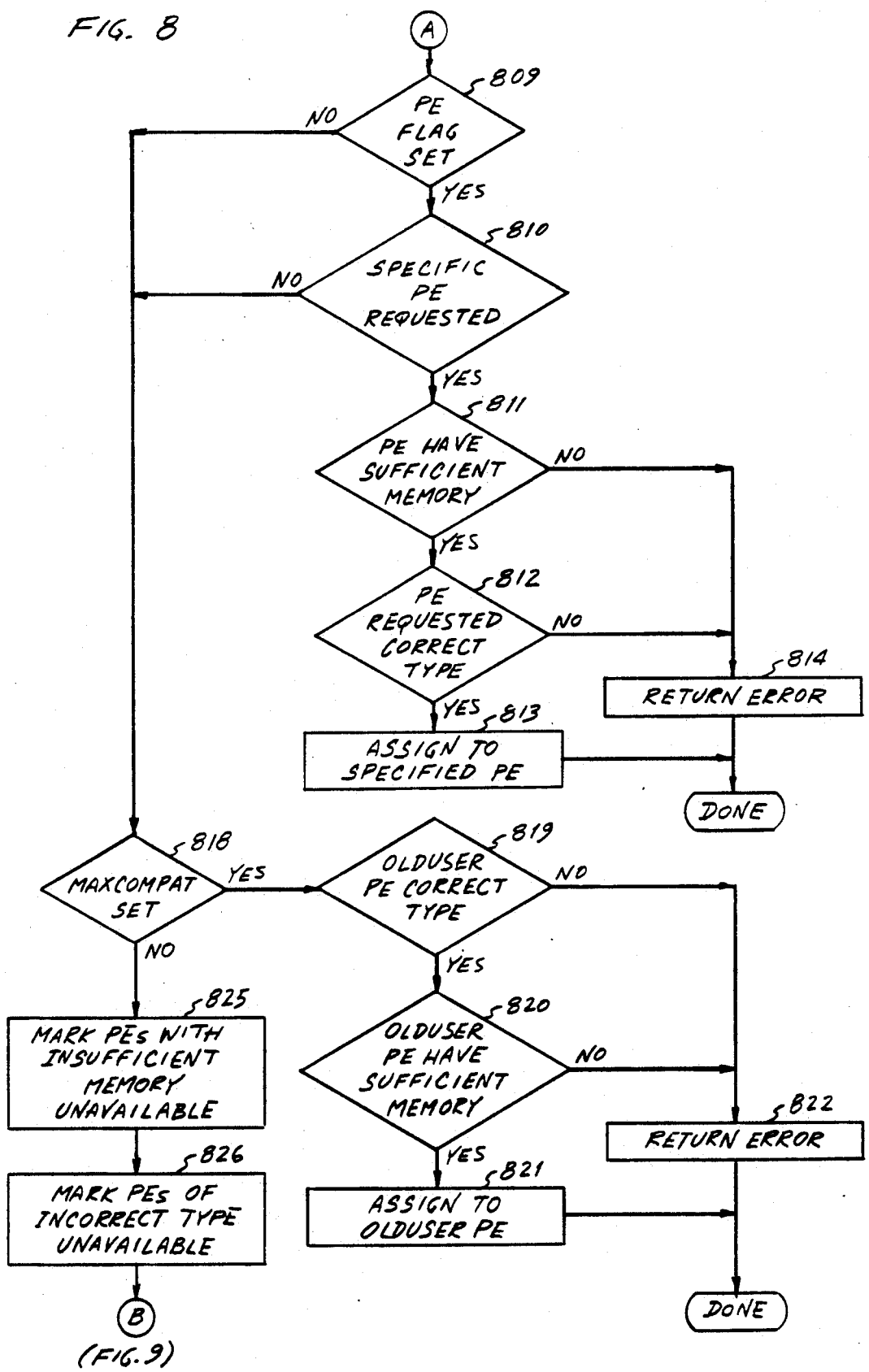

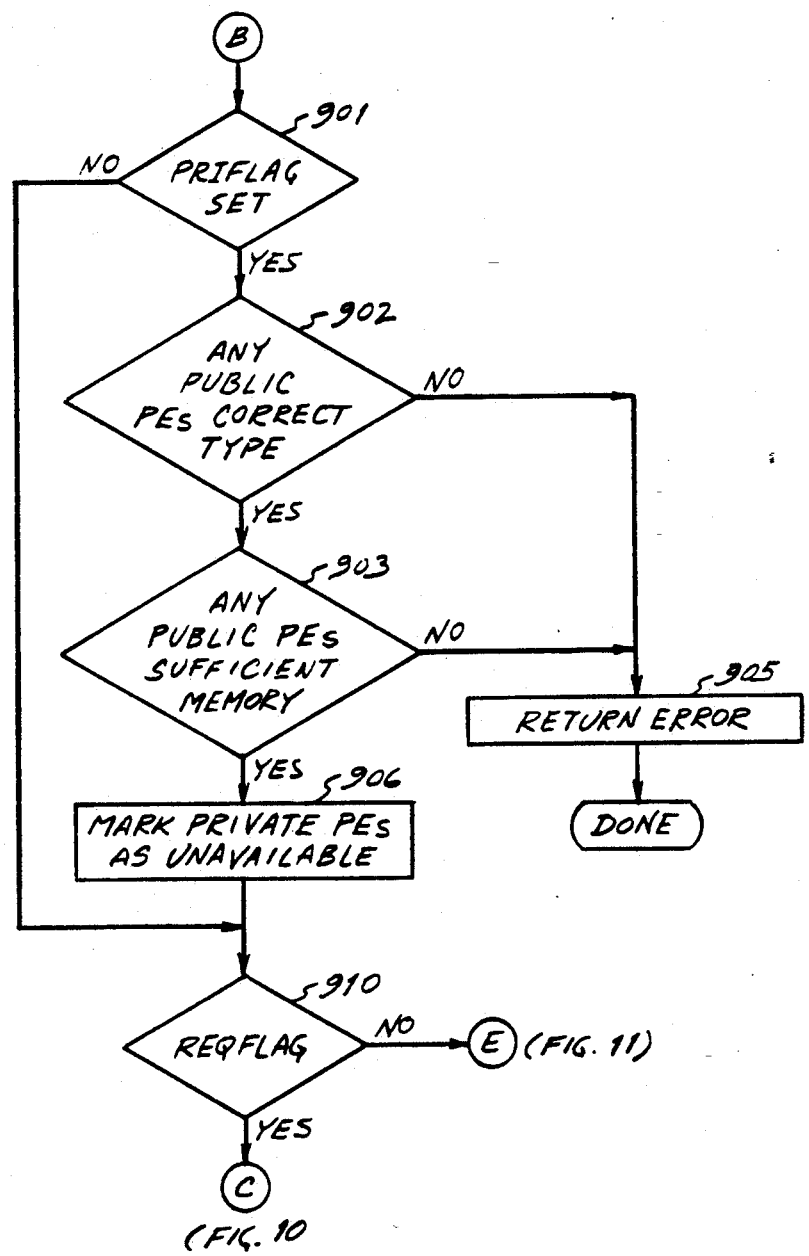

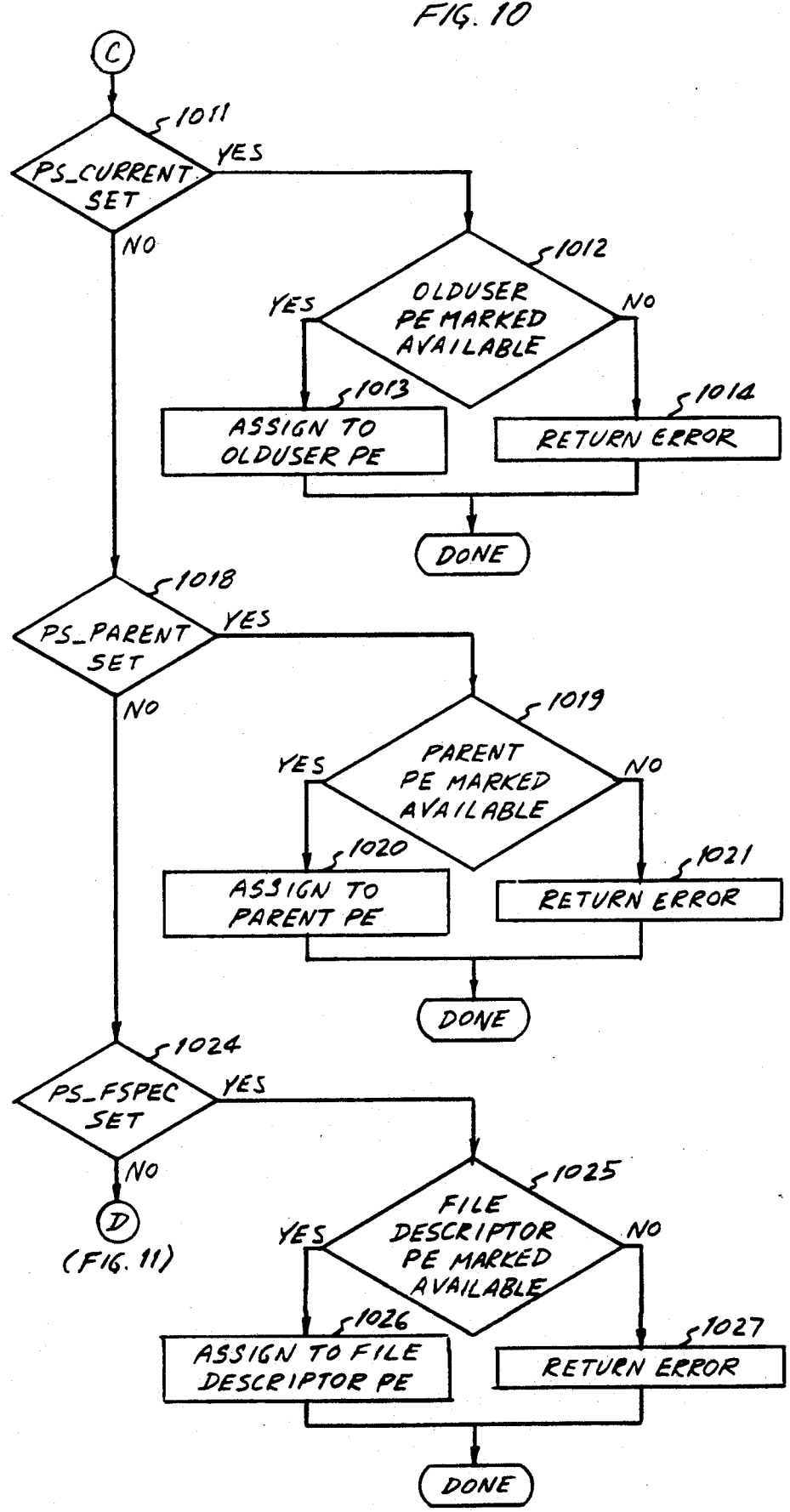

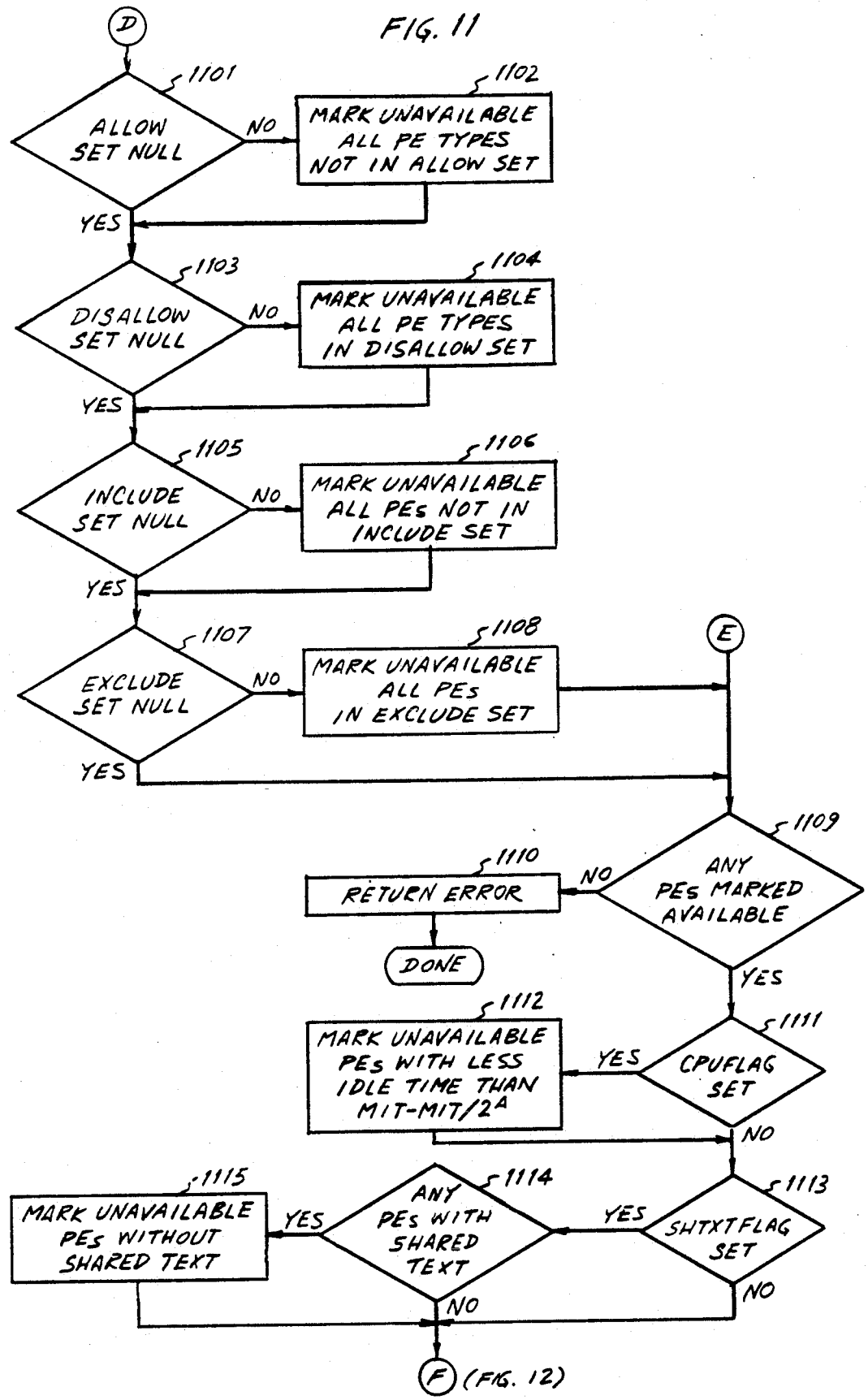

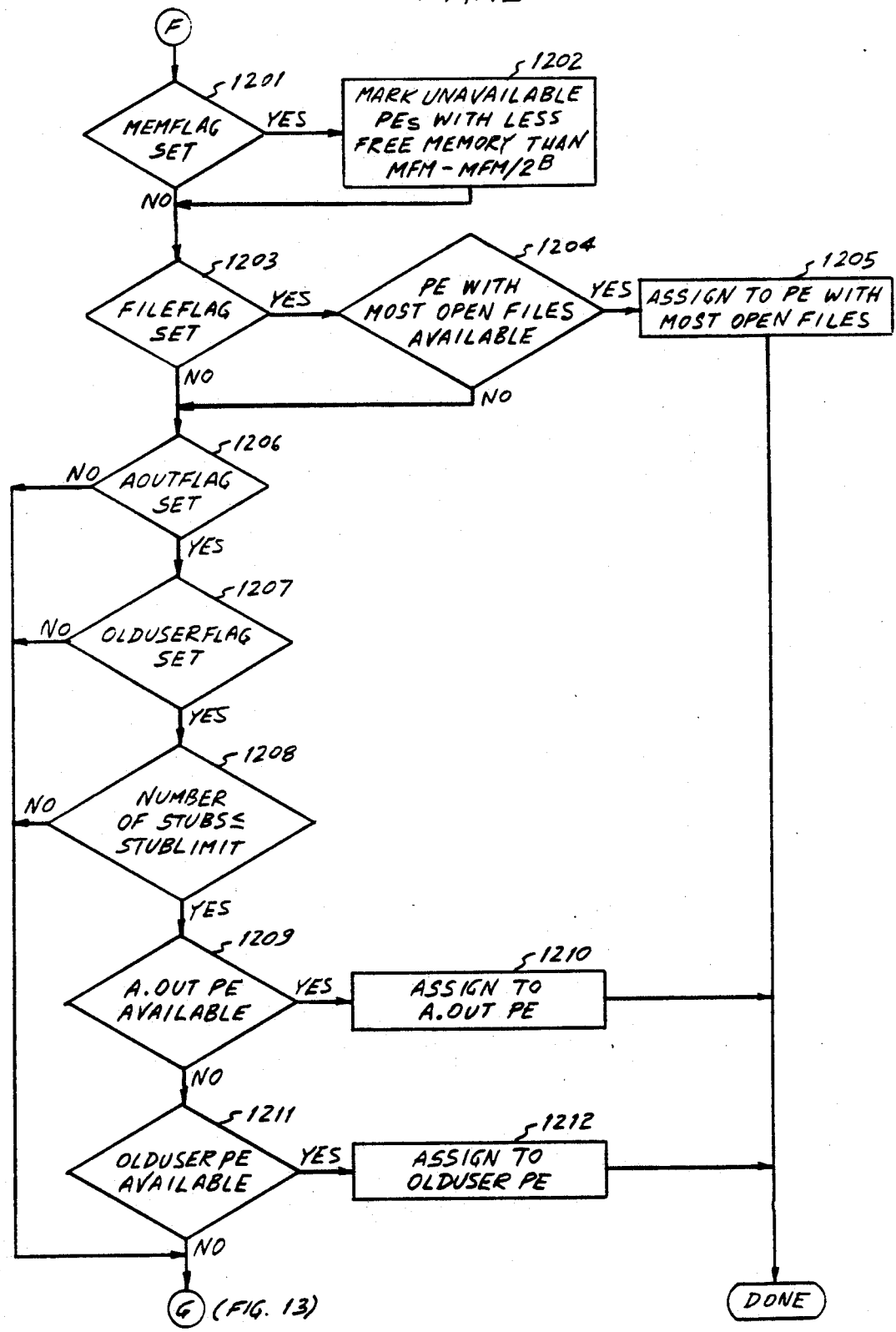

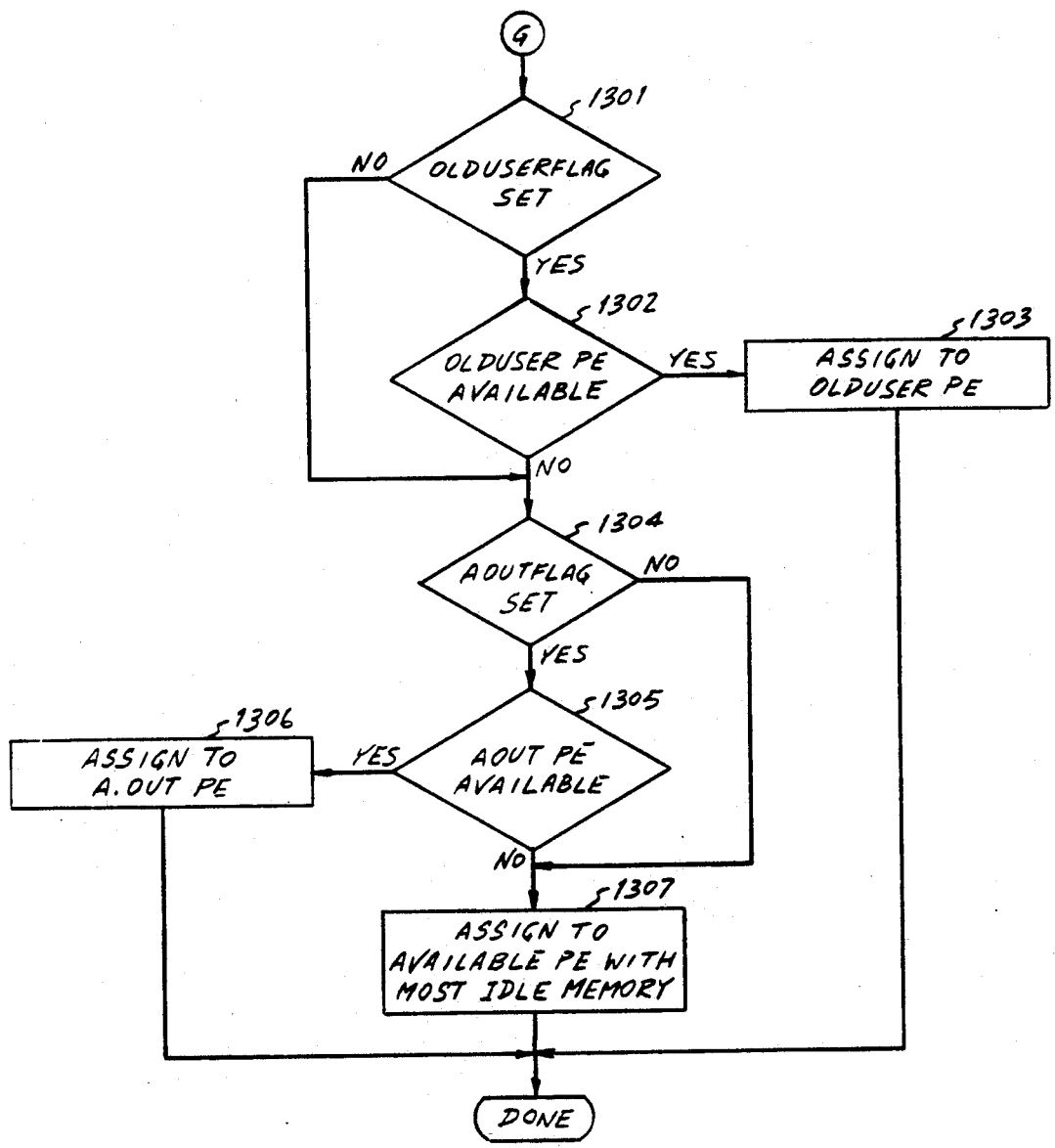

CONTROLLED DYNAMIC LOAD BALANCING FOR A MULTIPROCESSOR SYSTEM

This application is a continuation of application Ser. No. 06/941,701, filed on Dec. 22, 1986, now abandoned.

CROSS-REFERENCE TO RELATED APPLICATIONS

Concurrently filed herewith and assigned to the same assignee as this application are:

T. P. Bishop, et al., "Inter-Processor Communication Protocol", Ser. No. 941,702; now U.S. Pat. No. 4,914,653;

T. P. Bishop, et al., "Virtual Execution of Programs on a Multiprocessor System", Ser. No. 941,700; now U.S. Pat. No. 4,849,877; and T. P. Bishop, et al., "Extended Process for a Multiprocessor System", Ser. No. 944,586; now U.S. Pat. No. 4,901,231.

TECHNICAL FIELD

The invention relates generally to multiprocessor systems and more particularly to dynamic load balancing in a multiprocessor system.

BACKGROUND OF THE INVENTION

In a multiprocessor system, it is desirable to distribute the processing load among the various processors in the system. This function is often referred to as dynamic load balancing or processor assignment. Prior art systems have performed this function by utilizing fixed algorithms. One such algorithm is for all processors in the system to sequentially accept programs for execution as the programs require execution. Programs are often referred to as new jobs or processes. Another algorithm is to direct new programs to the processor that has the least amount of work. The techniques utilized by the prior art work well in certain types of processing environments. However, they suffer from the problems of not allowing the system administrator to adjust the dynamic loading algorithm to meet different conditions. In addition, the application programmer and/or user of a new program being assigned are given no control over how the processor assignments are made. The application programmer or user often have important information on which processor within a multiprocessor system should receive a particular job.

The problem then is to allow the assignment of processors for particular jobs to be adjusted by the system administrator and further to allow the application programmer or user of the program to adjust what processor or type of processor is utilized to run a particular program.

SUMMARY OF THE INVENTION

This invention is directed to solving these and other problems and disadvantages of the prior art. According to the invention, in a multiprocessor system, the system administrator, application programmer, and/or user of a new program being assigned are given the capability of adjusting the assignment function that determines which processor of the system will execute a given program.

Advantageously, this allows the multiprocessor system to be composed of a variety of different types of processors each having different capabilities and different resources. Further, it allows the application programmer or program user to efficiently place requirements on the processor assignment function to be utilized, thus allowing certain types of operations heretofore not capable of being implemented on a multiprocessor system to be so implemented in a straightforward manner.

The method controls the allocation of processor resources to a new program in a multiprocessor system by performing the steps of storing object code for a new program in the system, inserting a set of processor allocation parameters into the stored object code, reading the stored object code, and allocating one of the processors in response to the processor allocation parameters in the read object code.

The step of inserting comprises the step of writing the processor allocation parameters into the stored object code in response to a user command. The method further provides that other processor allocation parameters can be made available for use in the allocation step in response to a request to execute the stored object code. In addition, the system stores a plurality of system processor allocation flags, and the allocation step is responsive to both the system flags and processor allocation parameters for performing the allocation of one of the processors to execute the read object code.

These and other advantages and features of the present invention will become apparent from the following description of an illustrative embodiment of the invention taken together with the drawing.

BRIEF DESCRIPTION OF THE DRAWING

FIG. 2 illustrates, in flow chart form, the processor assignment function as implemented by the multiprocessor system of FIG. 1;

FIG. 3 illustrates, in table form, the flag structure that contains the system flags used for the processor assignment function;

FIG. 4 illustrates, in table form, the flags and parameters transferred to PM process 108 of computer 101;

FIG. 5 illustrates, in greater detail, a portion of FIG. 4;

FIG. 6 illustrates, in greater detail, another portion of FIG. 4; and

FIGS. 7 through 13 illustrate, in greater detail, the functions performed by the flowchart of FIG. 2.

DETAILED DESCRIPTION

Figure 1:
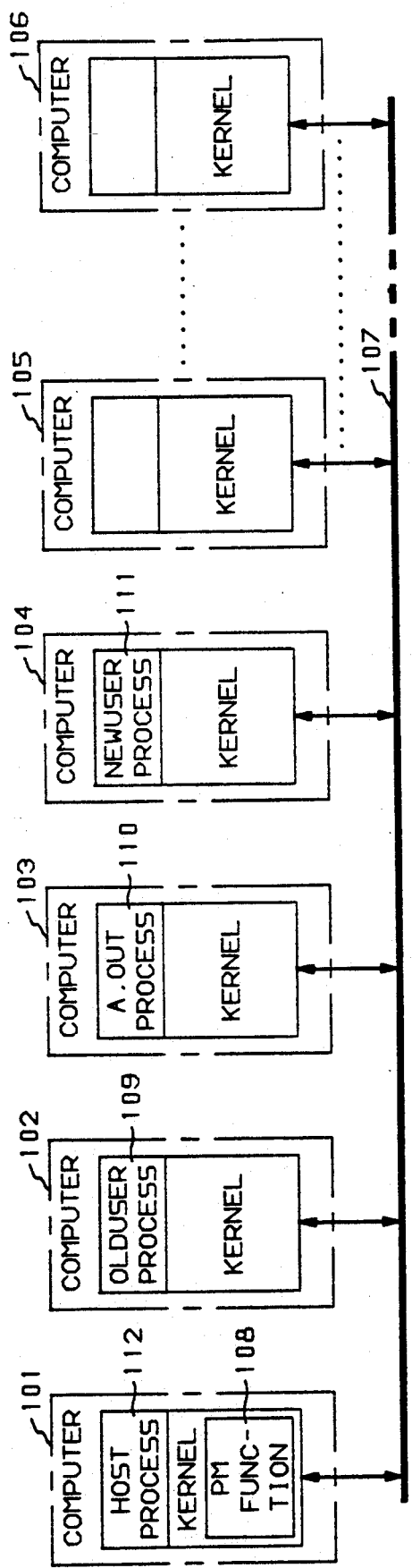
FIG. 1 illustrates, in block diagram form, a multiprocessor system for utilizing the present invention.

FIG. 1 shows a multiprocessor system having a plurality of computers 101 through 106 interconnected by bus 107. Each computer operates under control of an operating system which illustratively is similar to a version of the UNIX operating system described in the article by K. Thompson, "UNIX Implementation", The Bell System Technical Journal, July-August 1978, Volume 57, No. 6. A multiprocessor version of the UNIX operating system is illustrated in the copending application of Ser. No. 941,700, now U.S. Pat. No. 4,849,877. The initiation of a new program in the system illustrated in FIG. 1 is performed by an "exec" command which results in the program being automatically assigned to one of the computers also referred to as processors and illustrated in FIG. 1. In order to make that assignment, allocation of resources and dynamic load balancing is performed by process manager (PM) function 108 being executed by the kernel of computer 101. The latter computer is designated as the host computer of the system, FIG. 1. The execution of an exec system call by any computer of FIG. 1 results in PM function 108 being executed by the kernel of computer 101. The latter function's use of flags, variables, and parameters that are specified by the system administrator, application programmer, and/or program user to control the processor assignment, is the subject of this invention.

The system administrator first determines which one of five distinct assignment methods is to be utilized by setting a value into the selectsw variable. The different methods that may be selected are discussed in greater detail with respect to FIGS. 7 through 13. For the fifth method, the system administrator, application programmer and/or user can specify further adjustments for the allocation of processors. The system administrator adjusts the allocation of programs within the multiprocessor system by controlling the state of the flags in the flag structure illustrated in FIG. 3. The flag structure is maintained by the kernel of computer 101. A detailed explanation of how the execution of PM function 108 utilizes that structure to allocate computer resources is given with respect to FIGS. 7 through 13.

The application programmer and the user of the program can make adjustments to the fifth method by means of a sysmulti system call or an massign shell command, respectively. The effect of these adjustments is modified by those adjustments made by the system administrator. To understand how the application programmer passes his/her adjustments to the execution PM function 108, it is necessary to understand how the execution of a new program is implemented on the multiprocessor system of FIG. 1. The application programmer first writes a requesting program that will request the execution of the new program and that requesting program is presently being executed by a process on one of the processors on FIG. 1. For sake of example, assume that this processor is processor 102. The requesting program written by the application programmer first executes a fork command which replicates the executing process into a child and a parent process. These processes share the same program but have different data storage. The child process then executes the sysmulti system call. Parameters defined in this system call specify in a standard manner the adjustments that the application programmer wishes to make to the dynamic loading function performed by the execution of PM function 108.

After executing the sysmulti system call, the child process then executes the exec system call. More information concerning how the standard UNIX operating system fork and exec system calls function may be found in the previously mentioned article by Thompson.

The application programmer determines the adjustments that are to be made in the dynamic loading function at the time the source code of the requesting program is written. Upon execution of the sysmulti system call, the parameters defining the application programmer's adjustments are initially stored in the ublock of the process in a standard manner. These parameters are then passed to the kernel of computer 101 for use with PM function 108 during the execution of the exec system call.

The user of the program inputs the user's adjustments by the execution of the massign shell command. For example, if a user wished to execute a word processing program on a particular processor of the multiprocessor system illustrated in FIG. 1, the user would execute the massign command specifying a processor to which the program is to be assigned and the a.out file containing the word processing program. The massign command then inserts in a standard manner the latter information into the a.out file. The massign command is a very powerful tool since it allows the same program to be tailored with respect to system resources to meet the needs of individual program users.

FIG. 2 illustrates the procedure for controlling the allocation of computer resources and a overall view of the assignment function itself. Block 201 allows the system administrator to administer the system flags and the selectsw variable that are utilized in the assignment function. The selectsw variable and system flags are stored by computer 101 and are administered by the system administrator using well-known techniques. The structure that contains the system flags is illustrated in FIG. 3.

Block 202 allows the program user to utilize the massign command for adjusting the assignment function. If the user executes the latter command, block 203 is executed, and the parameters that specify these adjustments are stored in the a.out file.

Block 204 allows the application program to execute a sysmulti system call before executing the exec system call. If the sysmulti system call has been executed, block 205 is executed, and the parameters specified in the sysmulti system call are stored in the ublock of the executing child process by block 205. Block 206 is executed by the exec system call which reads the parameters that have been specified and transmits these along with other information to the kernel of computer for use with PM process 108.

PM function 108 then executes blocks 207 through 210. Block 207 checks to see if the selectsw variable specifies that the first four load balancing methods are to be utilized as indicated by block 209 or whether the fifth method that uses the system flags and parameters is to be utilized as indicated by 208. The procedure used to execute blocks 207 through 210 is referred to as the assignpe function.

During the execution of the exec system call, the latter system call reads the parameters from the ublock and/or from the a.out file and transfers these parameters to PM process 108. In order to make the processor assignment, the kernel of computer 101 calls the assignpe procedure in PM function 108. The flags and parameters that have been determined by the system administrator, application programmer, and user are passed to the latter function in the structure illustrated in FIG. 4. The peselset and assign structures of FIG. 4 are further defined in FIGS. 5 and 6, respectively.

The assignpe procedure is shown in greater detail in FIGS. 7 through 13. Blocks 701 through 708 implement the load balancing techniques of block 209 of FIG. 2. Block 701 examines the selectsw variable. If the contents of the selectsw variable equals 0, then block 702 is executed. The latter block uses a specific technique for assigning processors, and that technique is to examine the contents of the selectpe variable for the identity of the processor that is to be utilized for the execution of all programs. The assignment is then given to the identified processor. The contents of the selectpe variable are determined by the system administrator.

If selectsw does not equal 0, block 703 is executed; and if selectsw equals 1, then block 704 is executed after block 703. For convenience of nomenclature, all computers illustrated in FIG. 1 with the exception of computer 101 which is the host computer or host processor element, PE, are designated as adjunct computers or processor elements. Block 704 implements an assignment method whereby as the programs or jobs are received for assignment, the first program is assigned to the host PE and then the next is assigned to an adjunct PE with the third being assigned to a host PE with the fourth being assigned to another adjunct PE. If selectsw does not equal 1, decision block 705 is executed. If the selectsw variable equals a 2, then block 706 is executed. The latter block implements an assignment method whereby the programs are assigned to the host and adjunct computers in a cycling manner with each of the computers receiving the same number of assignments. If the selectsw variable does not equal 2, then decision block 707 is executed. If the selectsw variable equals 3, then block 708 is executed and the programs are assigned by cycling through only the adjunct computers.

If the contents of the selectsw variable are greater then 3, then the remainder of FIGS. 7 through 13 is executed implementing block 208 as illustrated in FIG. 2. First, in decision block 809 of FIG. 8, the state of the PEFLAG of FIG. 5 is tested to determine whether this flag is set or not. If that flag is set, then a specific computer may be designated in the PE_ASSIGN variable of FIG. 4 to execute the job. The specification of that computer is made by the application programmer or the user. If the PEFLAG flag is set, decision block 810 is executed to determine whether or not a specific computer has been designated. The contents of the PE_ASSIGN variable are utilized to make that determination. If a specific computer has not been specified, block 818 is executed. If a particular computer has been designated, decision block 811 is executed to determine whether the specified computer has sufficient memory; and decision block 812 is subsequently executed to determine whether the requested computer is of the correct type. If both of the conditions tested for by blocks 811 and 812 are met, block 813 is executed which assigns the specified computer to execute the present job. If those conditions that are tested for by blocks 811 and 812 are not met, then an error is returned via block 814.

Decision block 818 checks the MAXCOMPAT flag. The latter flag being set requires that every new job be assigned to the same computer that executed the exec system call. The latter computer is normally referred to as the olduser computer. If the MAXCOMPAT flag is set, decision block 819 is executed to determine whether or not the olduser computer is of the correct type to execute the new job. If the olduser computer is of the correct type, decision block 820 is executed to ascertain whether or not the olduser computer has sufficient memory to execute the new job. If both of the conditions that are checked for by blocks 819 and 820 are true, block 821 is executed which assigns the new job to the olduser computer. If either block 819 or 820 fails, an error is returned via block 822.

During execution, the assignpe procedure creates a table which defines which computers are available or unavailable. If the MAXCOMPAT flag is not set, block 825 is executed. Block 825 marks as unavailable all of the computers with insufficient memory. Then, block 826 marks as unavailable the computers which are of the incorrect type.

After execution of block 826, decision block 901 of FIG. 9 is executed to determine whether or not the PRIFLAG flag is set. This flag is stored in the structure illustrated in FIG. 5. If the PRIFLAG is set, only public computers are eligible for assignment. The difference between public and private computers is one of designation by the system administrator. For a variety of reasons, the system administrator can designate one or more computers as private and restrict the utilization of these computers to certain tasks or users. If the PRIFLAG flag is set, decision blocks 902 and 903 are executed to determine whether or not any public computers have sufficient memory and are of the correct type. If no public computers meet the two requirements tested for by blocks 902 and 903, block 905 is executed and an error is returned. If the requirements of blocks 902 and 903 are satisfied, 906 is executed, and all private computers are marked as unavailable.

Next, decision block 910 is executed to determine whether or not the REQFLAG flag is set. The latter flag is stored in the structure illustrated in FIG. 5. The latter flag being set indicates that computer assignment is to be carried out according to the parameters set by the massign command or sysmulti system call. These parameters are illustrated in FIG. 6. If the REQFLAG flag is set, the first parameters checked are those which are contained in entry 607 of FIG. 6. There are five parameter flags in entry 607: PS_CURRENT, PS_PARENT, PS_MABS, PS_FSPEC, and PS_EXPLICIT. The PS_MABS and PS_EXPLICIT are not used as part of the processor assignment. Decision block 1011 of FIG. 10 checks the PS_CURRENT flag. If this latter flag is set, it indicates that the new program is to be executed on the olduser processor. If the PS_CURRENT flag is set, decision block 1012 is executed to see if the olduser processor is marked as available. If the olduser processor is marked available, then the program is assigned to the olduser processor by block 1013. If the olduser processor is not available, then an error is returned by block 1014.

If the PS_CURRENT flag was not set, then decision block 1018 is executed to check whether or not the PS_PARENT flag is set. If the PS_PARENT flag is set, an attempt is made to assign the new program to the processor that is running the parent process of the process that executed the exec system call. If the PS_PARENT flag is set, decision block 1019 is executed to see if the parent processor is marked available. If the parent processor is marked available, the new program is assigned to this processor by block 1020. Otherwise, an error is returned via block 1021.

The next flag to be checked is the PS_FSPEC flag which is checked by decision block 1024. This flag indicates whether the processor local to a specific file descriptor given in entry 606 of FIG. 6 is to be used as the processor to receive the assignment. If the PS_FSPEC flag is set, then decision block 1025 checks to see if the processor local to this file is available. If that processor is available, then the program is assigned to that processor by block 1026. If the processor is not available, then an error is returned by block 1027.

If a processor assignment has not been made as a result of the checks performed in decision blocks 1011, 1018 and 1024 of FIG. 10, blocks 1101 through 1108 of FIG. 11 are executed to narrow down the number of processors available for receiving the program by applying the remainder of the parameters specified in FIG. 6. The contents of entries 601 and 602 specify whether certain types of processors are allowed or disallowed, respectively. There are three types of processors that can be allowed or disallowed: host computer (PS_HOSTFLAG), computation server processor (PS_CS), and file server processor (PS_FS). Decision block 1101 examines entry 601. If the contents of the latter entry are not zero, block 1102 is executed marking as unavailable all processors of processor types not in the allowed set. Next, decision block 1103 determines whether the disallowed set which is in entry 602 is null, and if it is not, block 1104 marks as unavailable all processors of processor types in entry 602.

Entries 603 and 604 of FIG. 6 allow the specification of whether or not each processor of FIG. 1 is to be included or excluded from being considered for the assignment to execute the new program. Blocks 1105 and 1106 determine the processors to be included, and blocks 1107 and 1108 determine the processors to be excluded.

After the above operations have been performed, decision block 1109 checks to see if there are any processors marked available. If no processors remain marked available, an error is returned by block 1110. If one or more processors are available, the remainder of the system flags are now utilized to make the processor assignment. Decision block 1111 checks to see if the CPUFLAG flag is set. The latter flag indicates that the processor assignment is to be based on processor loading, and that processors having less idle time then a certain amount are marked as unavailable. If the CPUFLAG flag is set, this determination is made by finding the processor with the maximum idle time (MIT). Then, block 1112 marks as unavailable those processors that have less idle time than given by the formula $MIT - MIT/2^A$. The variable A represents the variable CFUZZY which is a value that is predefined by the system administrator. CFUZZY is stored in the structure illustrated in FIG. 5.

Next, the SHTXTFLAG flag is checked by decision block 1113. This flag being set insures that if any of the remaining available processors have a sharable copy of the a.out file, assignment will be made to one of them. If the SHTXTFLAG flag is set, control is passed to decision block 1114 which determines whether or not there are any processors with a sharable copy of the a.out file. If there are processors with a sharable copy of the a.out file, block 1115 is executed; and the processors that do not have a sharable copy of the a.out file are marked as unavailable.

Next, decision block 1201 of FIG. 12 is executed. That decision block checks whether or not the MEMFLAG flag is set. When the latter flag is set, every processor with free global memory less than a specified amount is marked as unavailable. This determination is made by finding the processor with the maximum free global memory and then eliminating processors that have less free global memory than the maximum free global memory minus the maximum free global memory divided by $2^{MFUZZY}$. The variable MFUZZY is a variable determined by the system administrator. If the MEMFLAG flag is set, block 1202 is executed which marks the processors as unavailable that have less than the required amount of free memory. In block 1202, MFM represents maximum free global memory and the variable B represents the variable MFUZZY.

Next, the FILEFLAG flag is checked by decision block 1203. The latter flag when set indicates that the number and distribution of open files of the process executing the exec system call are to be used as a criterion for making the processor assignment. This decision is made in decision block 1204 by determining the processor that has the most open files of the executing process and whether or not this number of files is greater than or equal to the value in the FILELIMIT variable of the structure illustrated in FIG. 5. The latter variable is determined by the system administrator. If these conditions are met, then block 1205 is executed which assigns the new program to the processor with the most open files. If these conditions are not met, then decision block 1206 is executed.

Blocks 1206 through 1212 perform the following functions. If both AOUTFLAG and OLDUSERFLAG flags are set and if the number of remote processes associated with the process executing the exec system call is less than or equal to STUBLIMIT variable, an attempt is first made to assign the process to the processor that is local to the a.out file commonly called the a.out processor. A remote process allows the executing process to gain access to resources of another processor. If the latter processor is not available, a second attempt is made to assign the program to the processor that executed the exec system call, commonly called olduser processor. If neither of these processors are available or if the conditions tested for by 1206, 1207, and 1208 are not met, then control is passed to decision block 1301 of FIG. 13. If the conditions tested for by decision blocks 1206, 1207, and 1208 are met and the a.out processor is available, then the program is assigned to the a.out processor by block 1210. If the a.out processor is not available, decision block 1211 checks whether or not the olduser processor is available. If the olduser process is available, the program is assigned to the olduser process by decision block 1212.

If any of the conditions tested for by decision blocks 1206, 1207, or 1208 were not met, decision block 1301 is executed. If the OLDUSER flag is set and decision block 1302 determines that the olduser processor is available, the program is assigned to the olduser processor by block 1303. If either of the previously mentioned conditions are not met, decision block 1304 is executed. If the AOUTFLAG flag is set and the a.out processor is available, decision block 1306 is executed and assignment is made to the a.out processor. If assignment is not made to either the olduser or a.out processor, block 1307 is executed, and the program is assigned to the available processor with the most idle memory.

It is to be understood that the above-described embodiment is merely illustrative of the principles of the invention and that other arrangements may be devised by those skilled in the art without departing from the spirit and scope of the invention.

What is claimed is:

1. A method for controlling the allocation of system resources in a multiprocessor system having a plurality of processors and one of said processors storing an object code program in a file and said object code program to be initiated on said multiprocessor system, comprising the steps of:

writing by a requesting one of said processors which is requesting the execution of said object code program a set of processor allocation parameters into said stored object code program in response to a user command executed by a user of said multiprocessor system;

reading said stored object code program by an allocating one of said processors in order to allocate the execution of said object code program;

allocating an executing one of said processors by said allocating one of said processors in response to said processor allocation parameters which define processor resources in the read object code program to execute said read object code program; and providing by said requesting one of said processors other processor allocation parameters for use by said allocating step in response to a system call.

2. The method of claim 1 further comprises the step of storing by said allocating one of said processors system processor allocation flags and said allocating step further responsive to said stored system processor allocation flags to allocate said executing one of said processors.

3. A method for controlling the allocation of system resources in a multiprocessor system having a plurality of processors and one of said processors storing an object code program in a file and said object code program in a file and said object code program to be initiated on said multiprocessor system, comprising the steps of:

inserting a set of processor allocation parameters into said stored object code program by a requesting one of said processors which is requesting the execution of said object code program;

reading said stored object code program by an allocating one of said processors in order to allocate the execution of said object code program;

allocating an executing one of said processors by said allocating one of said processors in response to said processor allocation parameters which define processor resources in the read object code program to execute said read object code program;

said step of inserting comprises the step of writing a subset of said processor allocation parameters into said stored object code program in response to a user command executed by a user of said multiprocessor system;

storing by said requesting one of said processors a subset of said processor allocation parameters in response to a system call;

storing by said allocating one of said processors system processor allocation flags; and said allocating step further in response to said stored system processor allocation flags allocates said executing one of said processors.

4. The method of claim 3 wherein said allocating step further comprises the step of:

checking one of said system flags to determine whether a specific processor assignment is allowed;

verifying that a specific processor request which requested said executing one of said processors has been made upon said specific processor assignment being allowed; and assigning said executing one of said processors upon said specific processor request having been made.

5. The method of claim 4 wherein said allocating step further comprises the steps of:

checking whether a second one of said system flags designates that said requesting one of said processors be assigned to execute said object code program thereby becoming said executing one of said processors; and assigning said requesting one of said processors to execute said object code program upon said second system flags being set.

6. The method of claim 5 wherein said processors are grouped either as public or private processors and said allocating step comprises the steps of:

maintaining a table to indicate the availability or unavailability of each of said processors;

checking whether a third one of said system flags indicates that only public processors are to be assigned to execute said object code program;

checking to assure that at least one of said public processors are available to execute said object code program; and making in said table all private processors of said system as unavailable upon said third one of said system flags being set and at least one of said public processors being available.

7. The method of claim 6 wherein said allocating step further comprises the steps of:

checking a fourth one of said system flags indicating that ones of said processor allocation parameters designating the type of processor to be used for assignment are to be examined;

examining a first one of said parameters designating that said requesting one of said processors be given the assignment;

assigning said requesting one of said processors to execute said object code program upon said first one of said parameters being set;

checking a second one of said parameters designating that a specified processor associated with a given file is to be assigned to execute said object code program;

verifying that the processor associated with the specified file is available by examining a third one of said parameters upon said second one of said parameters being set; and assigning said associated processor to execute said object code program upon the examined third one of said parameters indicating the availability of said associated processor.

8. The method of claim 7 wherein a fourth one of said processor allocation parameters designates processor types allowable for processor assignment and a fifth one of said processor allocation parameters designates processor types disallowed for said processor assignment and a sixth one of said processor allocation parameters designates processors to be included in the allowable processors for said processor assignment and a seventh one of said processor allocation parameters designates processors to be excluded from allowable processors for the processor assignment and said allocating step further comprises the steps of:

marking as unavailable in said table all processors of processor types not designated in said fourth one of said processor allocation parameters;

marking as unavailable in said table all processors of said processor types designated in said fifth one of said processor allocation parameters;

marking as unavailable in said table all processors not designated in said sixth one of said processor allocation parameters; and marking as unavailable in said table all processors designated in said seventh one of said processor allocation parameters.

9. The method of claim 8 wherein said allocating step further comprises the steps of:

checking a fifth one of said system flags indicating that information concerning processor loading is to be utilized in determining the processor assignment;

determining the loading for each of said processors;

calculating a load value on the basis of the processor with the least load; and marking as unavailable in said table processors with loading in excess of the calculated value.

10. The method of claim 9 wherein said allocating step further comprises the steps of:
   checking a sixth one of said system flags indicating that information concerning whether one of said processors is already executing another occurrence of said object code program;
   determining whether any of said processors are executing another occurrence of said object code program upon said sixth one of said system flags being set; and
   marking as unavailable in said table all processors that are not executing another occurrence of said object code program upon one of said processors executing another occurrence of said object code program.

11. The method of claim 10 wherein said allocating step further comprises the steps of:
   checking a seventh one of said system flags indicating that the amount of free memory of each of said processors is to be utilized in making the processor assignment;
   determining the amount of free memory of each of said processors;
   determining the processor that has the maximum amount of free memory available;
   calculating a lower value of free memory on the basis of the determined maximum amount of free memory; and
   marking as unavailable in said table all processors having less than said lower value of free memory.

12. The method of claim 11 wherein said allocating step further comprises the steps of:
   checking an eighth one of said system flags indicating whether or not the number of open files related to said object code program on one of said processors is to be utilized in making the processor assignment;
   determining the one of said processors with the open files upon said eighth one of said system flags being set;
   verifying that said one of said processors with the most open files is available; and
   assigning said processor with the most open files to execute said object code program upon said processor with the most open files being marked available in said table.

13. The method of claim 12 wherein said system stores a plurality of system variables and a first one of said system variables contains a maximum limit of the number of processors associated with said object code program and said allocating step comprising the steps of:
   checking a ninth one of said system flags indicating that the processor associated with said file storing said object code program is to be utilized for processor assignment;
   checking a tenth system flag indicating that the processor requesting execution of said object code program is to be utilized in said processor assignment;
   comparing the number of processors associated with said program requesting the execution of said object code program;
   assigning said processor associated with said file storing said object code program to execute said program upon said ninth system flag being set and said tenth system flag being set and the number of processors associated with said object code program requesting the execution of said object code program being less than said first one of said system variables and said processor associated with said file storing said object code program being available; and
   assigning said requesting one of said processors upon said processor associated with said file being marked unavailable in said table and said ninth system flag being set and said tenth system flag being set and the number of processors associated with said file storing said object code program requesting the execution of said object code program less than said first one of said system variables.

14. The method of claim 13 wherein said allocating step further comprises the step of assigning said requesting processor to execute said object code program upon said tenth system flag being set.

15. The method of claim 14 wherein said allocating step further comprises the step of assigning said processor associated with said file having said object code program to execute said object code program upon said ninth system flag being set.

16. The method of claim 15 wherein said allocating step further comprises the steps of:
   determining the available memory of each of the processors marked as available in said table; and
   assigning the processor with the greatest amount of available memory that is marked as being available in said table to execute said object code program.

* * * * *